(12) United States Patent
Doyle et al.

(10) Patent No.: US 8,675,986 B2
(45) Date of Patent: Mar. 18, 2014

(54) REDUCING MOIRÉ PATTERNS

(75) Inventors: Brian Doyle, Lake Oswego, OR (US);
Ralph Munsen, New York, NY (US);
Eric Cole, Lake Oswego, OR (US);
James Bean, New York, NY (US)

(73) Assignee: Hachette Book Group, Inc., New York, NY (US)

( * ) Notice: Subject to any disclaimer, the term of this patent is extended or adjusted under 35 U.S.C. 154(b) by 172 days.

(21) Appl. No.: 13/309,493

(22) Filed: Dec. 1, 2011

(65) Prior Publication Data

US 2013/0142450 A1 Jun. 6, 2013

(51) Int. Cl.
*G06K 9/40* (2006.01)
*H04N 1/46* (2006.01)

(52) U.S. Cl.
USPC .......................................... 382/275; 358/533

(58) Field of Classification Search
USPC ......... 382/260, 264, 274, 275, 298–300, 305, 382/312; 358/1.2, 3.03, 3.06, 3.08, 3.12, 358/528, 533, 536, 534
See application file for complete search history.

(56) References Cited

U.S. PATENT DOCUMENTS

| 5,323,247 | A | * | 6/1994 | Parker et al. | 358/3.08 |
| 5,337,162 | A | * | 8/1994 | Sakano | 358/3.01 |
| 5,515,456 | A | * | 5/1996 | Ballard | 382/252 |
| 5,798,846 | A | * | 8/1998 | Tretter | 382/262 |
| 6,437,881 | B1 | | 8/2002 | Baba et al. | |
| 6,608,941 | B1 | * | 8/2003 | Suzuki et al. | 382/272 |
| 7,116,446 | B2 | * | 10/2006 | Maurer | 358/3.08 |
| 7,298,927 | B2 | * | 11/2007 | Nako et al. | 382/298 |
| 7,532,363 | B2 | * | 5/2009 | Curry et al. | 358/3.08 |
| 2006/0209317 | A1 | | 9/2006 | Shoda et al. | |
| 2011/0249305 | A1 | | 10/2011 | Okamoto | |

FOREIGN PATENT DOCUMENTS

EP 1100257 5/2001

OTHER PUBLICATIONS

EPO Search Report for EP Application No. 12156651.7-1902, dated Mar. 7, 2013.
EPO Communication pursuant to Article 94(3) for EP Application No. 12156651.7-1902, dated Mar. 25, 2013.

* cited by examiner

*Primary Examiner* — Kanjibhai Patel
(74) *Attorney, Agent, or Firm* — Fish & Richardson P.C.

(57) ABSTRACT

Among other disclosed subject matter, a computer-implemented method includes receiving illustrated content. The illustrated content includes half-tone content. The method includes blurring at least part of the illustrated content. The blurring is performed according to a blur radius. The method includes downscaling the blurred illustrated content to an output size.

23 Claims, 13 Drawing Sheets

REDUCING MOIRÉ PATTERNS

BACKGROUND

This specification relates to image processing.

Moiré patterns are optical effects that can appear in various images and video. For example, moiré patterns can appear in print images (e.g., newspaper print, comic books, etc.) and video content (e.g., television/cable broadcasts and/or streaming video). The moiré pattern can be an undesirable effect that degrades the quality of the images and/or video and/or distracts a user/viewer.

Halftone images (e.g., images that use dots varying in shape, size and/or spacing, to simulate a continuous tone) that are downscaled (e.g., reducing the size of the original image) and/or images with high-contrast alternating color lines are particularly susceptible to the moiré effect. For example, FIG. 1 illustrates a zoomed in portion of a black and white halftone gradient pattern 102. As seen in FIG. 1, the halftone gradient pattern 102 includes dots of various sizes and spacing. When the halftone gradient pattern 102 is viewed from a distance (e.g., zoomed out), the halftone gradient pattern 102 appears as a continuous gradient pattern 104. FIG. 1 also illustrates an example downscaled reproduction 106 of the continuous gradient pattern 104. As seen in FIG. 1, the downscaled reproduction 106 includes the moiré pattern that can be introduced when downscaling the continuous gradient pattern 104.

SUMMARY

In general, one innovative aspect of the subject matter described in this specification can be embodied in methods that include receiving illustrated content. The illustrated content includes half-tone content. The methods include blurring at least part of the illustrated content. The blurring is performed according to a blur radius. The methods include downscaling the blurred illustrated content to an output size.

These and other aspects can optionally include one or more of the following features. The method can include removing text from the illustrated content before blurring at least part of the illustrated content, and inserting the removed text into the blurred illustrated content after downscaling the blurred illustrated content. The blur radius can be a function of a height of the illustrated content, an output height of the blurred illustrated content and a user defined parameter. The user defined parameter includes a blur-scaling factor having a value between 3 and 4.4. The method can include cropping the blurred illustrated content before downscaling the blurred illustrated content. The illustrated content can include manga images. Downscaling the blurred illustrated content can include downscaling the blurred illustrated content by at least one half. Receiving the illustrated content can include receiving the illustrated content from a content provider via a network. Blurring at least part of the illustrated content includes applying a Gaussian blur to the illustrated content.

Particular embodiments of the subject matter described in this specification can be implemented so as to realize one or more of the following advantages. For example, comic books or magazines that include half tone artwork can be processed to eliminate or reduce moiré patterns. The reduction or elimination of the moiré pattern can increase a viewer's enjoyment of the artwork. In addition, traditional newspapers (e.g., print version of a newspaper) can be digitally scanned and processed to eliminate or reduce moiré patterns. This can be beneficial for archival purposes because it can preserve the appearance of a newspaper's photographs or images.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
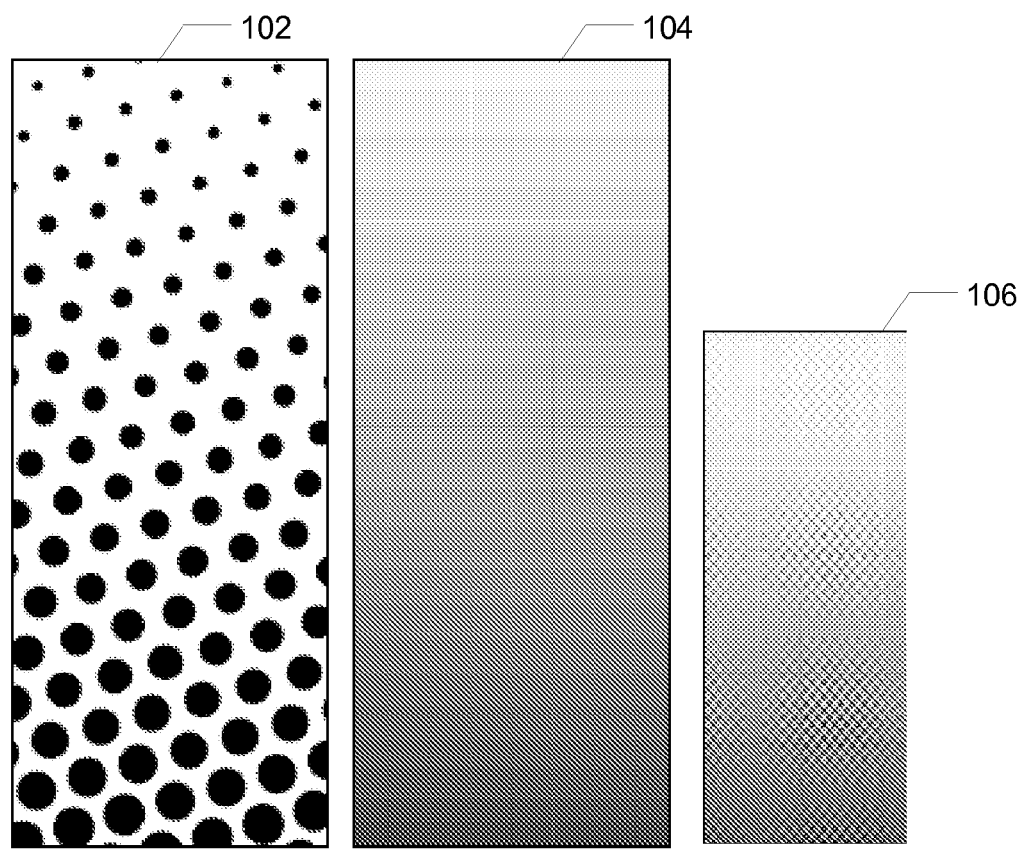
FIG. 1 illustrates example portions of halftone content.
Figure 2:
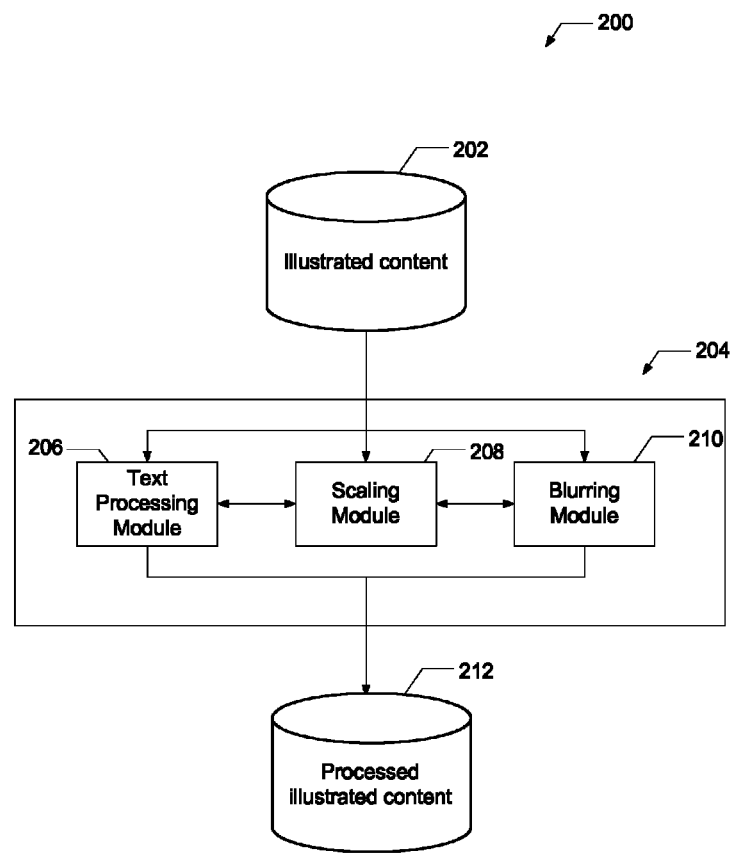
FIG. 2 illustrates an exemplary system to reduce moiré patterns.

FIG. 2 illustrates an exemplary system 200 to reduce moiré patterns. The system 200 includes illustrated content 202, an image processing module 204 and processed illustrated content 212.

Figure 3A:
FIGS. 3A and 3B illustrate example illustrated content.

The illustrated content 202 can be any appropriate type of digitized content that includes illustrations or graphics. For example, the illustrated content 202 can be a comic book or magazine that has been scanned and can include halftone artwork/images (e.g., pictures that include a halftone image similar to halftone gradient pattern 102). In addition, the illustrated content 202 can include digital publications (e.g., a comic book, a magazine, a newspaper, or other publication that originates in an electronic format) that include halftone artwork/images. The illustrated content 202 can also include text. In some implementations, the illustrated content 202 includes black and white manga-style comic books (e.g., black and white comic books using sequential art). FIG. 3A illustrates a portion 300 of an example black and white manga-style comic book. The portion 300 includes black and white artwork and text. The portion 300 also includes a region of the image 350 that is susceptible to the moiré pattern.

The illustrated content 202 is preferably scanned and stored in a high-resolution uncompressed format (e.g., TIFF format, a BMP format, etc.). The illustrated content 202 can be stored in a database or other appropriate type of memory. The illustrated content 202 can also include information that describes the illustrated content 202. For example, the illustrated content can include metadata that describes the height and width of the illustrated content 202 (e.g., a source height and a source width) and a height and width of the processed illustrated content 212 (e.g., a target height and a target width).

The image processing module 204 can be associated with a publisher (e.g., the publisher of the illustrated content 202) or a content producer and can be used to reduce or remove moiré patterns. The image processing module 204 includes a text processing module 206, a scaling module 208 and a blurring module 210. The text processing module 206 can receive the illustrated content 202 and create a copy of the illustrated content 202. The copy of the illustrated content can be in a bitmap format or other image/video format. The copy of the illustrated content can include the metadata associated with the illustrated content 202.

The text processing module 206 can remove text from the copy of the illustrated content. For example, a user of the image processing module 204 or a user associated with the illustrated content 202 can interact with the text processing module 206 to identify text included in the illustrated content 202 or identify regions of text included in the illustrated content 202. The user can mark the text or regions of text such that the image processing 204 removes the text from the copy of the illustrated content 202. In some implementations, the text processing module 206 can use a filter or mask to remove the text from the copy of the illustrated content. For example, the text processing module 206 can apply a filter that identifies text or regions of text in the copy of the illustrated content and can remove the text or region of text. If the illustrated content 202 includes a text layer (e.g., image data associated with an image is stored in a layer and picture data associated with an image is stored in a different layer), the text processing module 206 can remove the text by removing the text layer. The removed text can be stored in an image text file that includes the removed text but does not include graphics or images associated with the illustrated content 202.

In addition to removing the text from the illustrated content 202, the text processing module 206 can insert the text into the processed illustrated content 212 (e.g., the illustrated content after the moiré pattern is reduced or eliminated). For example, after the illustrated content 202 is processed to reduce the moiré patterns, which is described below, the text processing module 206 can insert the text that was removed from the illustrated content 202 into the blurred and downscaled illustrated content. In some implementations, text processing module composites the image text file (after it has been downscaled by the scaling module 208) with the blurred and downscaled illustrated content to insert the text. In some implementations where the illustrated content 202 includes black text on a white background, the text can be inserted into the blurred and downscaled illustrated content by multiplying the two images (e.g., illustrated content 202*blurred and downscaled illustrated content).

The scaling module 208 can receive the copy of the illustrated content and determine a scaling factor. For example, the scaling module can use the source height and the target height to calculate a vertical scaling factor (vSF). In some implementations, the vertical scaling factor can be equal to the target height/source height (e.g., vSF=target height/source height).

The scaling module 208 can analyze the vertical scaling factor to determine whether the vertical scaling factor is appropriate given the target width and the aspect ratio of the illustrated content (e.g., source width/source height). For example, the scaling module 208 can analyze the vertical scaling factor to determine whether the scaled width (i.e., source width*vSF) is less than or equal to the target width. If the scaled width is less than the target width, then the scaling module 208 can set the scaling factor to be equal to the vertical scaling factor (i.e., SF=vSF). Otherwise, the scaling module 208 can set the overall scaling factor to be equal to the horizontal scaling factor, which is equal to target width/source width (i.e., SF=target width/source width). The overall scaling factor can be used to scale the illustrated content 202 and/or the copy of the illustrated content.

The blurring module 210 can receive the copy of the illustrated content and blur the illustrated content. For example, the blurring module 210 can calculate a blurring radius and apply a Gaussian blur to the copy of the illustrated content. Other blurring algorithms can be used (e.g., a box blur, etc.). The blurring radius can be calculated from the source height and the target height. For example, the blurring radius can be equal to source height/target height/user defined parameter. The user defined parameter can be a blur-scaling factor used to adjust the blurring radius or the amount of blurring. The user defined parameter can be any number larger than zero. For example, the user defined parameter can be set to have a value of 4.0 and/or can be varied between approximately 3.0 to 4.4. The user defined parameter can be chosen based on the appearance of the processed illustrated content 212. For example, a user of the image processing module 204 can inspect the processed illustrated content 212 and determine whether the moiré pattern is sufficiently reduced or eliminated. If the user is not satisfied with the processed illustrated content 212, the user can adjust (e.g., increasing or decreasing) the parameter and process the illustrated content 202 again. In some implementations, the value of the user defined parameter can be varied using a slider or other user interface tool.

The blurring module 210 can also crop the blurred illustrated content. For example, the blurring module 210 can calculate a crop region and use the crop region to crop the blurred illustrated content. In some implementations, the crop region is determined based on the value of the blur radius. In some implementations, the blurring algorithm can cause the blurred illustrated content to be larger than the copied illustrated content because of the inclusion of faded edges that are artifacts created by the blurring algorithm. The blurring module 210 can crop the blurred illustrated content to remove the faded edges.

Figure 3B:

The image processing module 204 can output the processed illustrated content 212 (e.g., the illustrated content after reducing/removing the moiré pattern). FIG. 3B illustrates the portion of the example black and white manga-style comic book after the portion 300 of FIG. 3A has been processed. As seen in FIG. 3B, the processed illustrated content 212 is similar to the original illustrated content 202 and does not include a moiré pattern in the region 350.

The processed illustrated content 212 can be stored in various uncompressed image formats (e.g., TIFF format, BMP format, etc.) or compressed image formats (e.g., PNG or JPEG). The processed illustrated content 212 can be stored in a database, memory or other storage medium and/or provided to a user/viewer. The processed illustrated content 212 can be viewed by a user using a digital processing apparatus (e.g., a computer, a tablet computer, a laptop, a smart phone, etc.).

Figure 4:
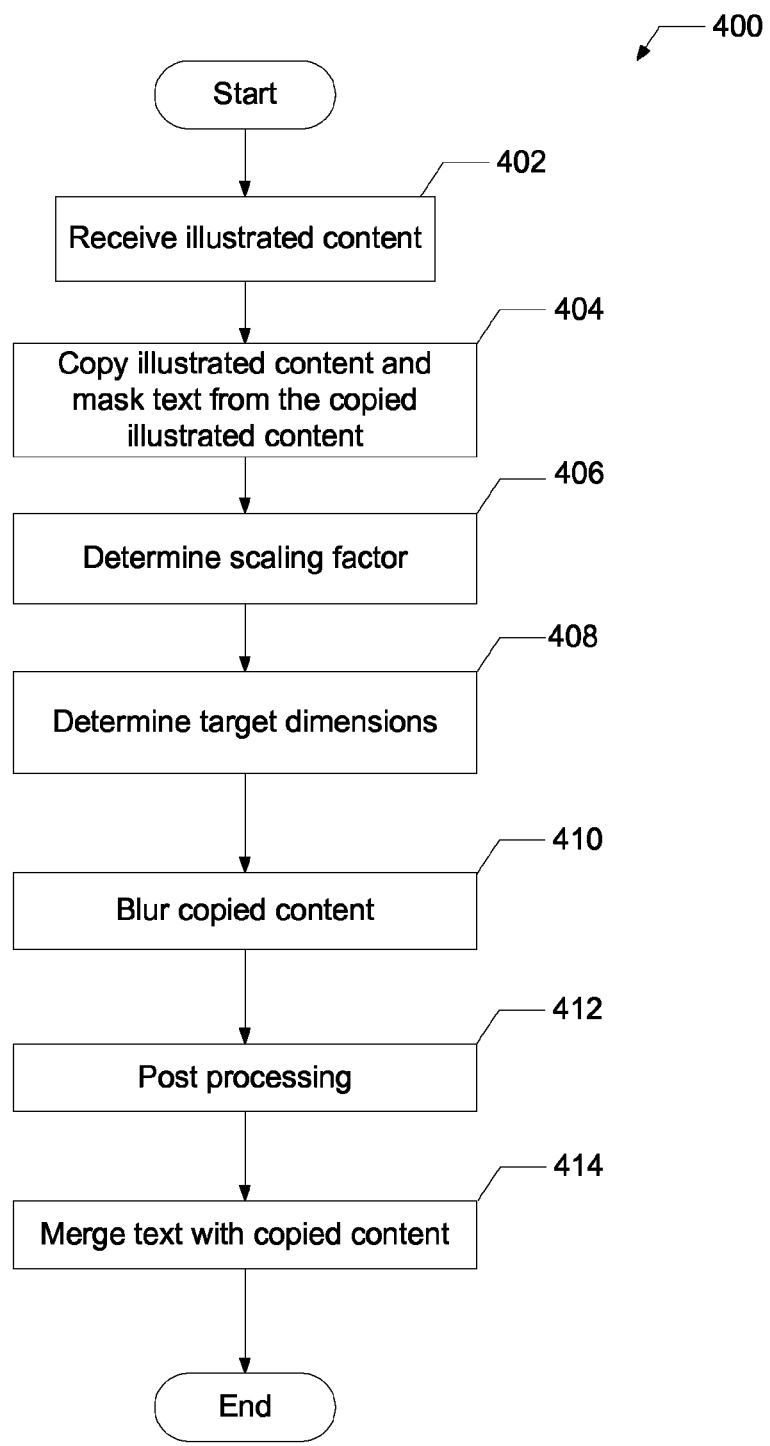
FIG. 4 is a flowchart of an exemplary process to reduce moiré patterns.

FIG. 4 is a flowchart of an exemplary process 400 to reduce or eliminate moiré patterns. Process 400 begins by receiving illustrated content (at 402). For example, the image processing module 204 can receive illustrated content 202 from a database or from a network connection. The illustrated content 202 can be an electronic copy of a comic book or printed publication that includes halftone artwork/images. The illustrated content can be similar to the portion 300 of the manga comic book shown in FIG. 3A. The illustrated content 202 can be stored in various formats. For example, the illustrated content 202 can be stored in a high-resolution uncompressed format (e.g., TIFF format, BMP format, etc). The illustrated content 202 can include for example and without limitation metadata that describes the dimensions of the illustrated content 202 (e.g., a source width and a source height) and metadata that describes the dimensions of the processed illustrated content 212 (e.g., a target width and a target height).

The illustrated content can be copied and the text can be removed from the copied illustrated content (at 404). For example, the text processing module 206 can create a copy of the illustrated content 202 and apply a filter or masking algorithm to remove the text from the copied illustrated content. In some implementations, a user of the text processing module 206 can identify text or regions of text such that the text processing module 206 removes the text from the copied illustrated content. The removed text can be stored in a separate image text file.

A scaling factor is then determined (at 406). For example, the scaling module 208 can analyze the metadata included in the illustrated content 202 to determine the overall scaling factor. For example, the scaling module 208 can use the source height and the target height to calculate a vertical scaling factor (e.g., vSF=target height/source height). The scaling module 208 can analyze the vertical scaling factor to determine whether the scaled width (i.e., source width*vSF) is less than or equal to the target width. If the scaled width is less than the target width, then the scaling module 208 can set the overall scaling factor (SF) to be equal to the vertical scaling factor (i.e., SF=vSF). Otherwise, the scaling module 208 can set the overall scaling factor to be equal to the horizontal scaling factor, which is equal to target width/source width (i.e., SF=target width/source width).

After the scaling factor is determined, the dimensions of the processed illustrated content can be determined (at 408). For example, the scaling module 208 can recalculate the target width and target height using the overall scaling factor (e.g., target width=SF*source width; target height=SF*source height).

The process 400 can continue by blurring the copied content (at 410). For example, the blurring module 210 can calculate a blurring radius using the dimensions of the copied illustrated content and the target dimensions and apply a blurring algorithm (e.g., a Gaussian blur algorithm, a box blur, etc.) to blur the copied content. In some implementations, the blurring radius is equal to source height/target height/user defined parameter. The user defined parameter can be set to have a value of 4.0 but can be changed be varied between approximately 3.0 to 4.4. The user defined parameter can be chosen based on the appearance of the processed illustrated content 212.

Figure 5:
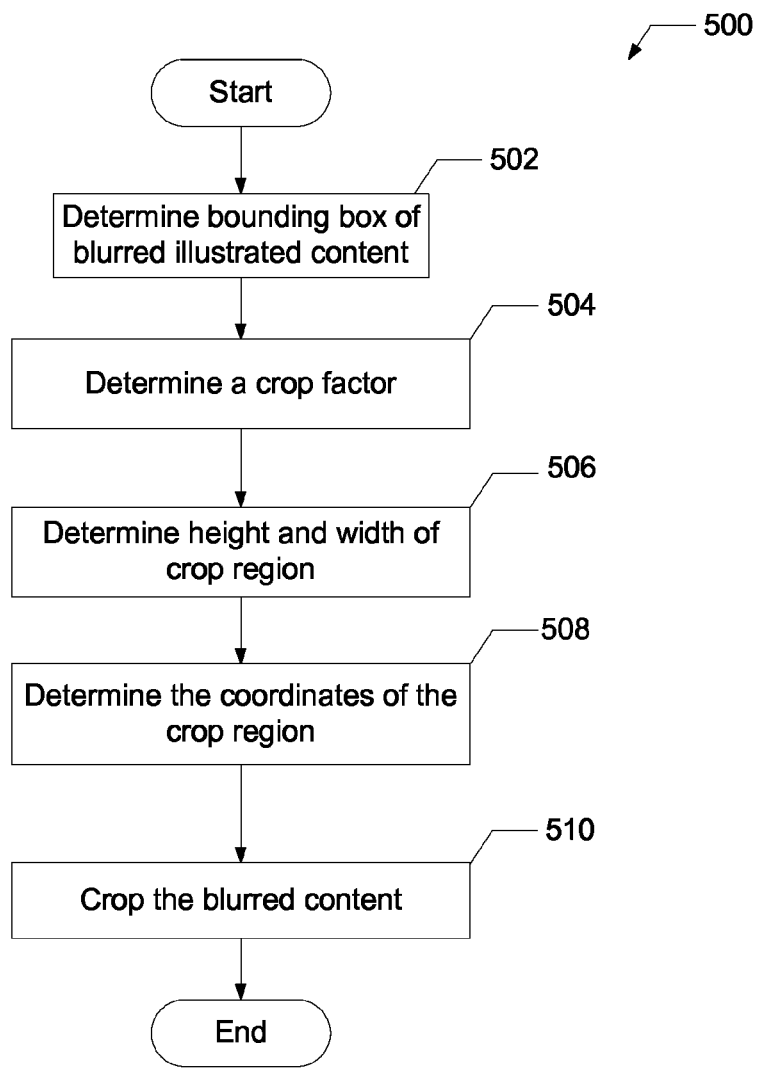
FIG. 5 is a flowchart of an exemplary process to crop blurred illustrated content.

After blurring the copied illustrated content, the blurred content can be post-processed (at 412). For example, because the blurring algorithm can cause the fading of the pixels near the edges of the blurred content, the blurring module can crop the blurred content. In some implementations, the dimensions of the blurred content and the blur radius can be used to determine the crop region (e.g., the portion of the blurred content that should remain after the cropping). For example, FIG. 5 illustrates a process 500 to calculate the cropped region of the blurred image.

Process 500 begins by determining the bounding box of the blurred illustrated content (at 502). For example, the bounding box can be a rectangle having an upper left corner at coordinates (0,0) and a height (bb_height) and width (bb_width) equal to the dimensions of the blurred content. In some implementations, the height and width of the blurred content can be determined by counting the number of vertical and horizontal pixels in the blurred content.

A crop factor (e.g., a multiplier representing how much of the blurred content should be cropped) can be determined based on the dimensions of the blurred content (at 504). For example, the crop factor (CF) can be equal to:

CF=(bb_height−(blur radius/4.0))/bb_height

Using the crop factor, the dimensions of the crop region can be determined (at 506). For example, the height and width of the crop region can be equal to:

Crop region height=bb_height*CF;

Crop region width=bb_height*CF;

The coordinates of the crop region can be calculated based on the dimensions of the crop region and the blurred content (at 508). For example, the upper left coordinates of the crop region can be equal to:

Crop region x=(bb_width−Crop region width)/2

Crop region y=(bb_height−Crop region height)/2

The blurred content is then cropped (at 510). For example, the blurred content can be cropped using the crop region such that the image data outside of the crop region is deleted. The remaining illustrated content is approximately the same size as the received illustrated content 212.

Returning to FIG. 4, in addition to cropping the illustrated content, the illustrated content can be downscaled to the target height and target width (at 412). For example, the scaling module 208 can scale the cropped illustrated content to have dimensions equal to the target height and the target width. In some implementations, the received illustrated content 202 is downscaled by a factor of two or more (e.g., the illustrated content 202 is at least twice as large as the scaled illustrated content). In some implementations, the amount of downscaling can be based on the dimensions of the illustrated content 202 and the desired dimensions of the processed illustrated content 212. In addition, the amount of downscaling can be based on the aspect ratio of the illustrated content 202 or the processed illustrated content 212.

After the post processing is completed (at 412), the text from the received illustrated content can be added to the blurred illustrated content. For example, the text module 206 can scale the image text file storing the text removed from the illustrated content 202 to have the same dimensions as the target height and the target width and then composite the scaled illustrated content 202 with the blurred illustrated content to add the text to the blurred illustrated content to generate the processed illustrated content 212. In some implementations, the processed illustrated content 212 is stored as a JPG or PNG image. The processed illustrated content 212 can be provided to a user or stored in a database or other storage medium.

Figure 6A:
FIGS. 6A-6D illustrate example illustrated content.
Figure 6B:
Figure 6C:

An illustrative example is provided in FIGS. 6A-6C. FIG. 6A illustrates an example illustrated content 600a that is received by the image processing module 204. As shown in FIG. 6A, the illustrated content 600a is a portion of a black and white comic book that includes a region of halftone artwork/images 602 that is susceptible to moiré patterns. For illustrative purposes, FIG. 6B illustrates the illustrated content 600b with the moire pattern in the region 602.

The illustrated content 600a can be received by the text processing module 206 and produce a copied illustrated content. The text processing module 206 can remove the text from the copied illustrated content. The blurring module 210 can receive the copied illustrated content and process the copied illustrated content to produce the blurred content 600c, shown in FIG. 6C. For example, the blurring module 210 can apply a Gaussian blur to the copied illustrated content 600b to produce the blurred content 600c.

The blurring module 210 can crop the blurred illustrated content 600c to remove faded edges and/or artifacts created by the blurring algorithm to produce a blurred content. In addition, the blurred content 600c can be downscaled by the scaling module 208.

Figure 6D:

The text processing module 206 can insert the text removed from the illustrated content 600a into the cropped and blurred content to produce the processed illustrated content 600d, shown in FIG. 6D. As seen in FIG. 6D, the processed illustrated content 600d does not include a moiré pattern.

Figure 7:
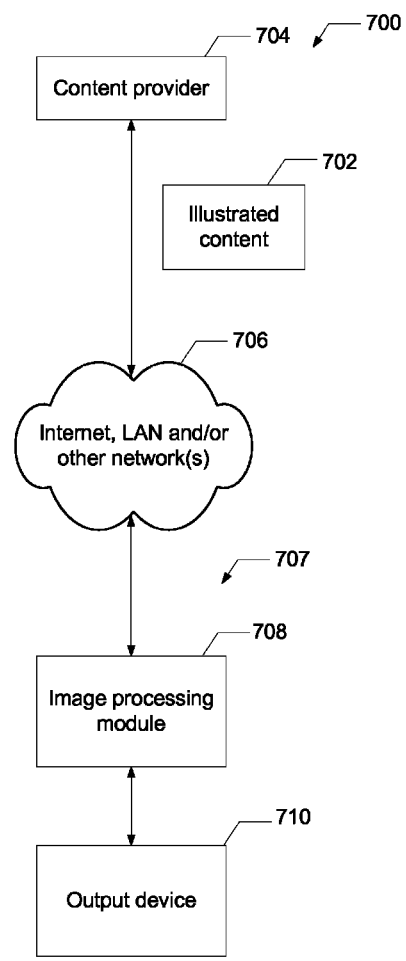
FIG. 7 is an exemplary system to reduce moiré patterns.

FIG. 7 is an exemplary system 700 to reduce moiré patterns. The example system 700 can include illustrated content 702, a publisher 704, a network 706, and a user device 707. The user device 707 can include an image processing module 708 and an output device 710.

The illustrated content 702 can be similar to the illustrated content 202 described above in connection with FIGS. 2 and 3A and 3B. In addition, the illustrated content 702 can include video content (e.g., television programming, streaming video content, etc.), website content or other content that is susceptible to moiré patterns.

The illustrated content 702 can be provided by an appropriate content provider 704. For example, the illustrated content 702 can be provided by a comic book publisher, a television network, a cable provider and/or a streaming video/Internet video provider. The content provider 704 can provide the illustrated content 702 to the user device 707 via the network 706.

The network 706 can be any type of network such as a local area network (LAN), wide area network (WAN), the Internet, or a combination thereof. The network 707 facilitates connectivity between the user device 707 and the publisher 704.

The user device 707 can be any appropriate type of data processing apparatus. For example, the user device 707 can be a computer, a laptop, a cable set top box, a tablet computer and/or a network accessible smart phone. The user device 707 can include an image processing module 708 and an output device 710.

The image processing module 710 can be similar to the image processing module 204 described above in connection with FIGS. 2 and 4. The image processing module 710 can be configured to reduce or eliminate the moiré pattern in real-time. For example, the illustrated content 702 can be received at the user device 707 and the image processing module 708 can process the illustrated content 702 immediately before displaying or as the illustrated content 702 is rendered for display on the output device 710. The output device 710 can be any type of visual display capable of displaying the illustrated content 702 (e.g., a monitor, a television, an LCD screen).

Figure 8:
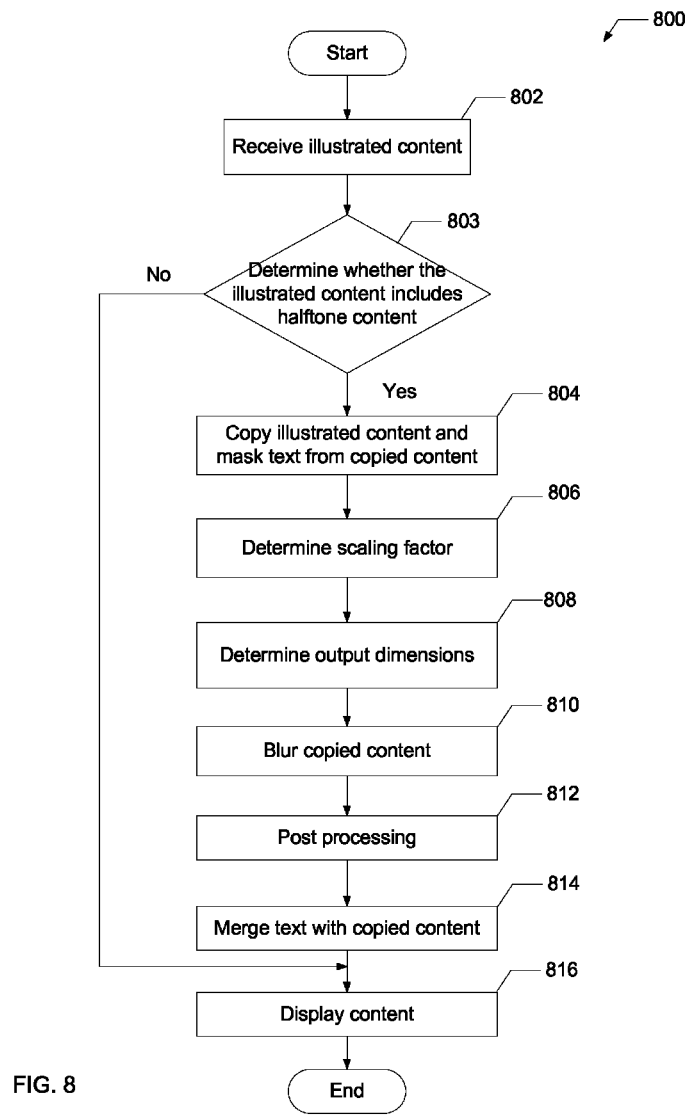
FIG. 8 is a flowchart of an exemplary process to reduce moiré patterns.

FIG. 8 is a flowchart of an exemplary process 800 to reduce moiré patterns. Process 800 is similar to process 400, described above in connection with FIG. 4. Process begins by receiving illustrated content (at 802). For example, the image processing module 708 can receive illustrated content 702 from a network connection 706 or from a stored file. The illustrated content 702 can be an electronic copy a printed publication that includes halftone artwork/images or video content that includes high-contrast alternating color lines. The illustrated content 702 can include metadata that describes the dimensions of the illustrated content 702 (e.g., a source width and a source height) and metadata that describes the dimensions of the processed illustrated content (e.g., a target width and a target height). In some implementations, the illustrated content 702 includes metadata to indicate that it includes halftone artwork/images and/or to indicate the location of the halftone artwork/images in the illustrated content (e.g., metadata that indicates the pixel coordinates of the illustrated content). In some implementations, the illustrated content 702 includes a flag, similar to an html tag that indicates halftone artwork or content.

Process 800 continues by determining whether the illustrated content 702 includes halftone content (e.g., artwork) (at 803). In some implementations, the image processing module 708 analyzes the illustrated content to determine whether the metadata or flags indicate that the illustrated content 702 includes halftone content. In some implementations, the image processing module 708 can automatically detect the presence of halftone content by analyzing the pixels. For example, a noise estimation algorithm can be used to detect the presence of halftone content. In some implementations, a two dimensional Gabor filter could be used to detect the presence of the halftone content. If the illustrated content does not include halftone content or other content that is susceptible to moiré effects, the illustrated content is displayed (at 816).

If the illustrated content 702 includes halftone artwork or other content that is susceptible to a moiré effect, the process continues by processing the illustrated content to reduce or eliminate the moiré pattern (at 804-814) as described above in connection with FIG. 4.

Figure 9:
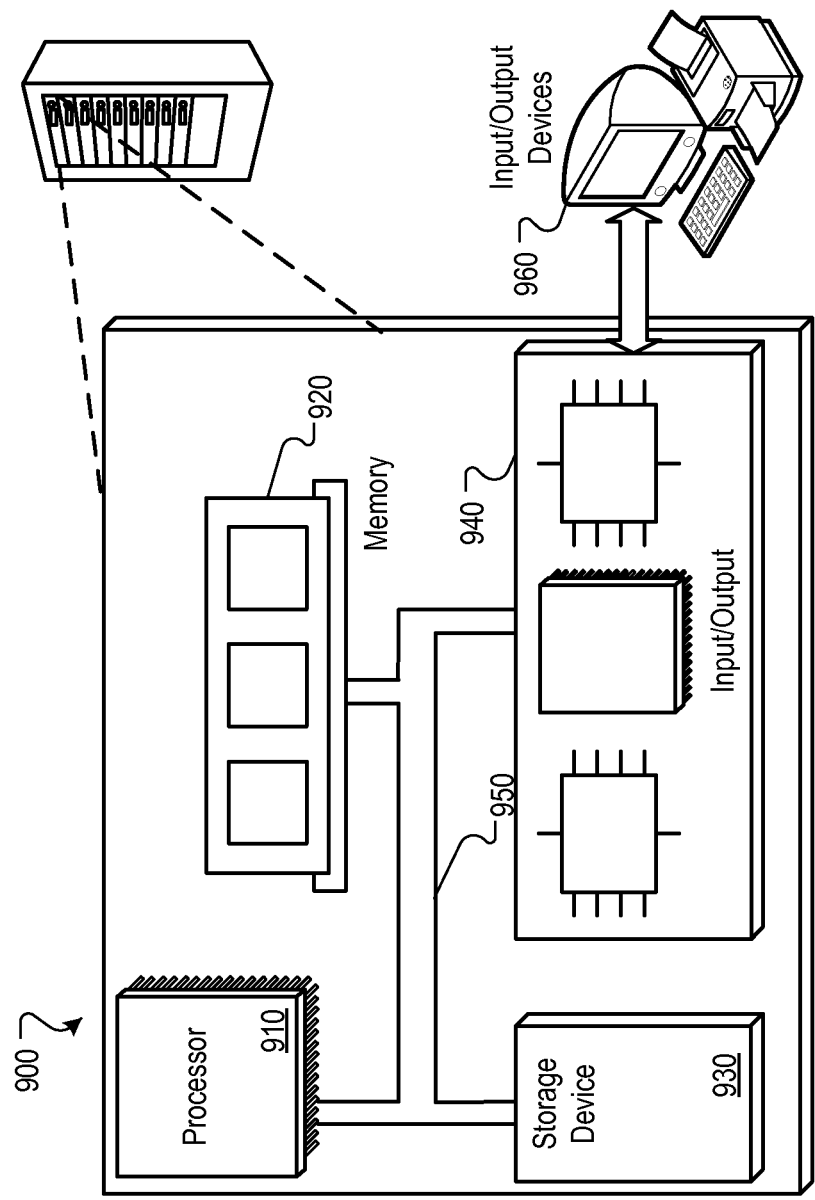
FIG. 9 is a block diagram of an example computer system that can be used to implement the moiré reduction system.

FIG. 9 is block diagram of an exemplary computer system 900 that can be used to implement the image processing modules 204 and/or user device 707. The system 900 includes a processor 910, a memory 920, a storage device 930, and an input/output device 940. Each of the components 910, 920, 930, and 940 can be interconnected, for example, using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 can include, for example, a hard disk device, an optical disk device, or some other large capacity storage device.

The input/output device 940 provides input/output operations for the system 900. In one implementation, the input/output device 940 can include one or more of a network interface device, e.g., an Ethernet card, a serial communication device, e.g., and RS-232 port, and/or a wireless interface device, e.g., an IEEE 802.11 card. In another implementation, the input/output device can include driver devices configured to receive input data and send output data to other input/output devices, e.g., keyboard, printer and display devices 960. Other implementations, however, can also be used, such as mobile computing devices, mobile communication devices, set-top box television client devices, etc.

The various functions of the image processing module 204 and/or user device 607 can be realized by instructions that upon execution cause one or more processing devices to carry out the processes and functions described above. Such instructions can comprise, for example, interpreted instructions, such as script instructions, e.g., JavaScript™ or ECMAScript instructions, or executable code, or other instructions stored in a computer readable medium. The image processing module 204 and/or user device 707 can be distributively implemented over a network, such as a server farm, or can be implemented in a single computer device.

Although an example processing system has been described in FIG. 9, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, a processing system. The computer readable medium can be a machine readable storage device, a machine readable storage substrate, a memory device, a composition of matter effecting a machine readable propagated signal, or a combination of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Although a few implementations have been described in detail above, other modifications are possible. For example, in some situations, different amounts of blurring can be applied to the illustrated content. For example, a first blurring radius or a first amount of blur can be applied to a first portion of the illustrated content and a second blurring radius or a second amount of blur can be applied to a second portion of the illustrated content. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method to reduce a moiré effect associated with illustrated content, the method comprising:
    receiving illustrated content having a horizontal dimension of h pixels and a vertical dimension of v pixels, wherein the illustrated content includes half-tone content;
    blurring at least part of the illustrated content, wherein the blurring is performed according to a blur radius;
    cropping the blurred illustrated content to a cropped size;
        wherein the cropped sized has a horizontal dimension of h multiplied by a crop factor, and a vertical dimension of v multiplied by the crop factor; and
        wherein the crop factor is equal to h minus one-fourth the blur radius, divided by h; and
    downscaling the blurred illustrated content from the cropped size to an output size.

2. The method of claim 1 further comprising:
    removing text from the illustrated content before blurring the at least part of the illustrated content; and
    inserting the removed text into the blurred illustrated content after downscaling the blurred illustrated content.

3. The method of claim 1 wherein the blur radius is a function of a height of the illustrated content, an output height of the blurred illustrated content and a user defined parameter.

4. The method of claim 3 wherein the user defined parameter comprises a blur-scaling factor having a value between about 3.0 and 4.4.

5. The method of claim 1 wherein the illustrated content comprises manga images.

6. The method of claim 1 wherein downscaling the blurred illustrated content comprises downscaling the blurred illustrated content by at least one half.

7. The method of claim 1 wherein receiving the illustrated content comprises: receiving the illustrated content from a content provider via a network.

8. The method of claim 1 wherein blurring at least part of the illustrated content comprises applying a Gaussian blur to the illustrated content.

9. A computer-implemented method to reduce a moire effect associated with illustrated content, the method comprising:
    receiving illustrated content having a horizontal dimension of h pixels and a vertical dimension of v pixels, wherein the illustrated content includes half-tone content and text content;
    removing the text content from the illustrated content before blurring the at least part of the illustrated content;
    blurring at least part of the illustrated content, wherein the blurring is performed according to a blur radius;
    cropping the blurred illustrated content to a cropped size;
        wherein the cropped sized has a horizontal dimension of h multiplied by a crop factor, and a vertical dimension of v multiplied by the crop factor; and
        wherein the crop factor is equal to h minus one-fourth the blur radius, divided by h;
    downscaling the blurred illustrated content and the removed text content from the cropped size to an output size;

inserting the removed text content into the blurred illustrated content after downscaling the blurred illustrated content; and storing the downscaled illustrated content.

10. A system to reduce a moire effect associated with illustrated content, the system comprising:

memory, wherein the memory stores processor executable instructions; and one or more processors operable to execute the instructions to perform operations comprising:

receiving illustrated content having a horizontal dimension of h pixels and a vertical dimension of v pixels, wherein the illustrated content includes half-tone content;

blurring at least part of the illustrated content, wherein the blurring is performed according to a blur radius;

cropping the blurred illustrated content to a cropped size;
wherein the cropped sized has a horizontal dimension of h multiplied by a crop factor, and a vertical dimension of v multiplied by the crop factor; and
wherein the crop factor is equal to h minus one-fourth the blur radius, divided by h; and downscaling the blurred illustrated content from the cropped size to an output size.

11. The system of claim 10 wherein the operations further comprise:

removing text from the illustrated content before blurring the at least part of the illustrated content; and inserting the removed text into the blurred illustrated content after downscaling the blurred illustrated content.

12. The system of claim 10 wherein the blur radius is a function of a height of the illustrated content, an output height of the blurred illustrated content and a user defined parameter.

13. The system of claim 12 wherein the user defined parameter comprises a blur-scaling factor having a value between 3.0 and 4.4.

14. The system of claim 10 wherein the illustrated content comprises manga images.

15. The system of claim 10 wherein downscaling the blurred illustrated content comprises downscaling the blurred illustrated content by at least one half.

16. The system of claim 10 wherein receiving the illustrated content comprises: receiving the illustrated content from a content provider via a network.

17. The system of claim 10 wherein blurring at least part of the illustrated content comprises applying a Gaussian blur to the illustrated content.

18. A non-transitory computer readable medium encoded with a computer program comprising instructions that, when executed, operate to cause a computer to perform operations:

receiving illustrated content having a horizontal dimension of h pixels and a vertical dimension of v pixels, wherein the illustrated content includes half-tone content;

blurring at least part of the illustrated content, wherein the blurring is performed according to a blur radius;

cropping the blurred illustrated content to a cropped size;
wherein the cropped sized has a horizontal dimension of h multiplied by a crop factor, and a vertical dimension of v multiplied by the crop factor; and
wherein the crop factor is equal to h minus one-fourth the blur radius, divided by h; and downscaling the blurred illustrated content from the cropped size to an output size.

19. The non-transitory computer readable medium of claim 18 wherein the operations further comprise:

removing text from the illustrated content before blurring the at least part of the illustrated content; and inserting the removed text into the blurred illustrated content after downscaling the blurred illustrated content.

20. The non-transitory computer-readable medium of claim 18 wherein the blur radius is a function of a height of the illustrated content, an output height of the blurred illustrated content and a user defined parameter.

21. The non-transitory computer-readable medium of claim 18 wherein blurring at least part of the illustrated content comprises applying a Gaussian blur to the illustrated content.

22. A system to reduce a moire effect associated with illustrated content, the system comprising:

a first interface for receiving data comprising illustrated content, the illustrated content including half-tone content having a horizontal dimension of h pixels and a vertical dimension of v pixels;

means for blurring at least part of the illustrated content, wherein the blurring is performed according to a blur radius;

means for cropping the blurred illustrated content to a cropped size;
wherein the cropped sized has a horizontal dimension of h multiplied by a crop factor, and a vertical dimension of v multiplied by the crop factor; and
wherein the crop factor is equal to h minus one-fourth the blur radius, divided by h;

means for downscaling the blurred illustrated content from the cropped size to an output size; and a second interface for transmitting data corresponding to the smaller size illustrated content.

23. The system of claim 22 wherein the first interface and second interface are integrated.

* * * * *